United States Patent
Wang

(12) 
(10) Patent No.: US 6,329,983 B1
(45) Date of Patent: Dec. 11, 2001

(54) METHOD AND APPARATUS FOR AUTOMATICALLY DETECTING CONNECTING STATUS OF A VIDEO OUTPUT PORT

(75) Inventor: Hsien-Chao Wang, Taipei Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/237,499

(22) Filed: Jan. 25, 1999

(30) Foreign Application Priority Data

Oct. 23, 1998 (TW) ............................................ 87117560 A

(51) Int. Cl.[7] .................................................... G09G 5/00
(52) U.S. Cl. .................................. 345/211; 345/1; 345/3
(58) Field of Search ................................ 345/211, 1, 2, 345/3, 156, 87; 348/552, 553

(56) References Cited

U.S. PATENT DOCUMENTS 5,307,055 * 4/1994 Baskin et al. ............................ 345/1

* cited by examiner

*Primary Examiner*—Dennis-Doon Chow
(74) *Attorney, Agent, or Firm*—Jiawei Huang; J. C. Patents

(57) ABSTRACT

A method and apparatus is provided for automatically detecting whether a video output port on a computer video display adapter is currently externally connected or disconnected. In practice the method and apparatus can be utilized, for example, on a video display adapter having an S output port and an AV output port to detect which one of them is currently externally connected for video transmission. The method and apparatus is characterized in the provision of a microswitch on one of the video output ports, for example the S output port. The microswitch is set to a first state when the S output port is externally disconnected (i.e., no insertion connector is inserted therein), and will be actuated to a second state when the S output port is externally connected (i.e., the insertion connector of a cable is inserted therein). Accordingly, when the microswitch is in a connected state, it indicates that the other port, i.e., the AV output port, is currently externally connected for video transmission; and whereas, when the microswitch is in disconnected state, it indicates that the S output port is currently externally connected. Therefore, the video display adapter can discern which one of the two video output ports is currently externally connected simply by detecting the connected/disconnected state of the microswitch.

10 Claims, 2 Drawing Sheets

METHOD AND APPARATUS FOR AUTOMATICALLY DETECTING CONNECTING STATUS OF A VIDEO OUTPUT PORT

CROSS-REFERENCE TO RELATED APPLICATION

This application claims the priority benefit of Taiwan application serial no. 87117560, filed Oct. 23, 1998, the full disclosure of which is incorporated herein by reference.

BACKGROUND OF THE INVENTION

1. Field of the Invention

This invention relates to computer video display technology, and more particularly, to a method and apparatus for automatically detecting whether a video output port on a computer video display adapter is currently externally connected or disconnected. In practice, the invention can be utilized, for example, on a video display adapter having an S output port and an AV Output port to detect which one of them is currently externally connected for video transmission to the video display unit.

2. Description of Related Art

A video display adapter for a personal computer (PC) is typically included with a television (TV) function that allows the PC monitor or a TV set to display digital video programs. This kind of video display card includes two different kinds of video output ports—an S output port and an AV output port—for connection to a PC monitor or a TV set. Conventionally, the use of the S output port or the AV output port is selectively set by jumper means or through software means by the operating, system (OS) of the computer. These setting methods, however, are both inconvenient to carry out.

If the video display card is set to use the AV output port, when the S output port on the TV set is connected via a cable to the S output port on the video display card, the video signal from the video display card is almost impossible to display on the TV screen. This is because the output video signal from the S output port is coded in a non-composite format, while the output video signal from the AV output port is coded in a composite format.

One drawback to the S/AV setting by the OS is that it can be carried out only after the computer is powered on and booted up, and the video image that is displayed after power-on and prior to entering the OS cannot be changed.

One drawback to the use of jumper means to set the S/AV option is that it is quite inconvenient to carry out since it requires the user to dismantle the PC case each time the jumper setting is to be changed.

SUMMARY OF THE INVENTION

The present invention provides a method and apparatus for use on a video display adapter having an S output port and an AV output port. Either of the S output port or the AV output is currently externally connected for video transmission can be detected thereby. The detected result can be subsequently used to set S/AV option of the video display adapter.

In accordance with the foregoing, and other objectives of the present invention, a new method and apparatus that can achieve the foregoing objective is provided.

Broadly speaking, the method and apparatus of the invention can be utilized on a video display adapter having two video output ports including a first video output port and a second video output port to detect which one of the two video output ports is currently externally connected. In practice, for example, the two video output ports can be an S output port and an AV output port. The method and apparatus are characterized by the provision of a microswitch on one of the video output ports, for example the S output port. The microswitch is set to a first state when the S output port is externally disconnected (i.e., no insertion connector is inserted therein), and will be actuated to a second state when the S output port is externally connected (i.e., the insertion connector of a cable is inserted therein). Accordingly, when the microswitch is in a connected state, it indicates that the other port, i.e., the AV output port, is currently externally connected for video transmission; whereas when the microswitch is in a disconnected state, it indicates that the S output port is currently externally connected. Therefore, the video display adapter can discern which one of the two video output ports is currently externally connected simply by detecting the connected/disconnected state of the microswitch.

Three preferred embodiments of the invention are disclosed in accordance with the foregoing concept.

In the first preferred embodiment, the apparatus of the invention comprises: (a) a microswitch mounted on the video output port and having a first end connected to a setting signal output port and a second end connected to a ground voltage representing a low-voltage logic state, the microswitch actuated to a connected state when the video output port is externally disconnected and to a disconnected state when the video output port is externally connected; and (b) a resistor having a first end connected to the setting signal output port and a second end connected to a system voltage representing a high-voltage logic state. When the microswitch is in a connected state, the setting signal output port takes on the ground voltage and thus outputs a LOW-state logic signal serving to indicate that the video output port is currently externally disconnected; and whereas when the microswitch is in a disconnected state, the setting signal output port takes on the system voltage via the resistor and thus outputs a HIGH-state logic signal serving to indicate that the video output port is currently externally connected.

In the second preferred embodiment, the apparatus of the invention comprises: (a) a microswitch mounted on the video output port and having a first end connected to a first node and a second end connected to a ground voltage representing a low-voltage logic state, the microswitch actuated to a connected state when the video output port is externally disconnected and to a disconnected state when the video output port is externally connected; (b) a diode whose positive end is connected to a bias voltage representing a high-voltage logic state; (c) a resistor having a first end connected to the first node and a second end connected to the negative end of the diode; (d) an inverter whose input end s is connected to the first node and whose output end is connected to a second node; and (f) a setting signal output port connected to the second node. When the microswitch is in a connected state, the setting signal output port takes on the inverted version of the ground voltage and thus outputs a HIGH-state logic signal serving to indicate that the video output port is currently externally disconnected; and whereas when the microswitch is in a disconnected state, the setting signal output port takes on the inverted version of the bias voltage via the resistor and the diode and thus outputs a LOW-state logic signal serving to indicate that the video output port is currently externally connected.

In the third preferred embodiment, the apparatus of the invention comprises: (a) a microswitch mounted on the video output port and having a first end connected to a first node and a second end connected to a ground voltage representing a low-voltage logic state, the microswitch actuated to a connected state when the video output port is externally disconnected and to a disconnected state when the video output port is externally connected; (b) a diode whose positive end is connected to a bias voltage representing a high-voltage logic state; (c) a first resistor having a first end connected to the first node and a second end connected to the negative end of the diode; (d) a BJT whose base is connected to the first node, whose emitter is connected to the ground, and whose collector is connected to a second node; (e) a second resistor having a first end connected to a system voltage representing a high-voltage logic state and a second end connected to the second node, and (f) a setting signal output port connected to the second node.

When the microswitch is in a connected state, the BJT is switched off, causing the setting signal output port to take on the system voltage via the second resistor and thus output a HIGH-state logic signal serving to indicate that the video output port is currently externally disconnected; whereas when the microswitch is in a disconnected state, the BJT is switched on by the bias voltage, causing the setting signal output port to take on the ground voltage via the BJT and thus output a LOW-state logic signal serving to indicate that the video output port is currently externally connected.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a method and apparatus that can be utilized on a computer video display adapter with two video output ports, such as an S output port and an AV output port, for automatically detecting which one of them is currently externally connected; i.e., whether the S output port or the AV output port is currently externally connected for video transmission. The video display adapter can be an expansion card or integrated on the computer motherboard. The detected result will then allow the video display adapter to set the S/AV option accordingly so as to output video signal from the selected port.

Figure 1A:
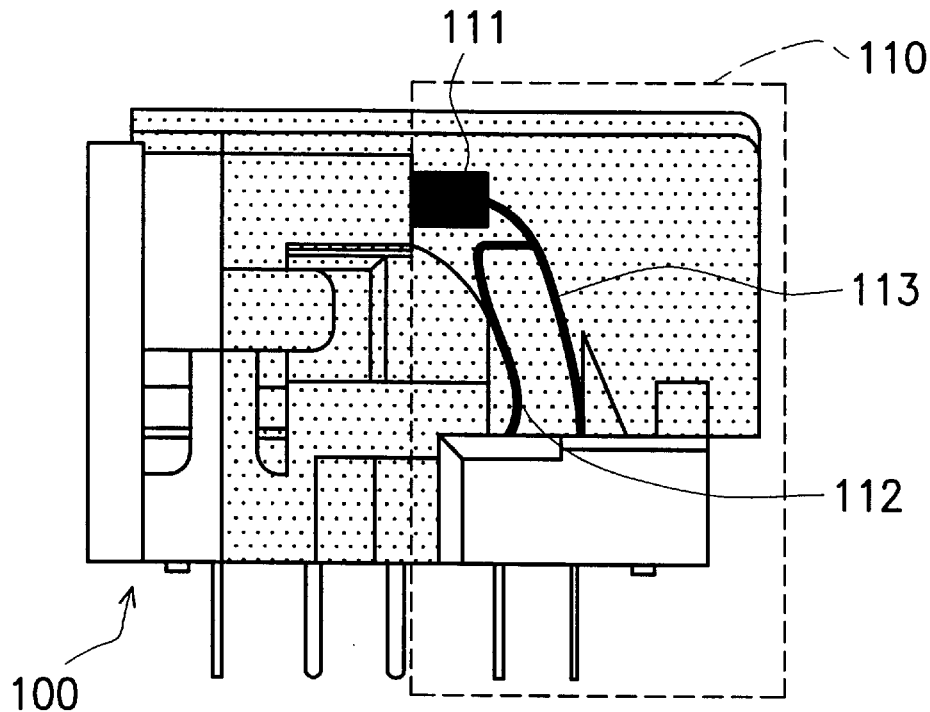
FIG. 1A is a schematic, cross-sectional view of an S output port which is mounted with a microswitch that serves as a constituent component of the apparatus of the invention.

As shown in FIG. 1A, the invention is characterized in the provision of a microswitch 110 on one of the video output ports, for example the S output port 100. The microswitch 110 is composed of an actuator 111 and a pair of elastic conductive pieces 112, 113. When the S output port 100 is externally disconnected (i.e., no insertion connector is inserted therein), the two conductive pieces 112, 113 are abutted on each other to form an electrical contact. This effectively puts the microswitch 110 in a connected state.

Figure 1B:
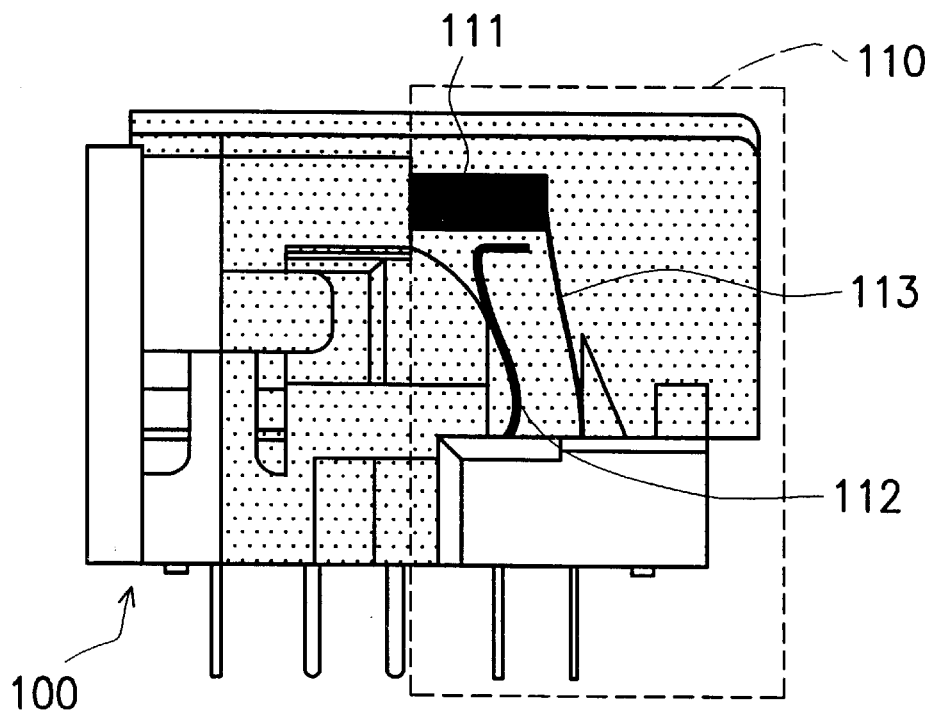
FIG. 1B is a schematic, cross-sectional view of the same of FIG. 1A except that the S output port is externally connected.

As shown in FIG. 1B, when the S output port 100 is externally connected (i.e., the insertion connector of a cable is inserted therein), the actuator 111 is urged by the insertion connector and thereby pushes the second conductive piece 113 away from the first conductive piece 112, thus breaking the electrical contact between the first and second conductive pieces 112, 113. This effectively puts the microswitch 110 in a disconnected state.

Accordingly, when the microswitch 110 is in a connected state, it indicates that the other port, i.e., the AV output port, is currently externally connected for video transmission; whereas when the microswitch 110 is in a disconnected state, it indicates that the S output port is currently externally connected. Therefore, the video display adapter can discern which one of the two video output ports is currently externally connected simply by detecting the connected/disconnected state of the microswitch 110. Three preferred embodiments of the invention are disclosed in full details in the following, with reference to FIGS. 2, 3, and 4, respectively.

First Preferred Embodiment

Figure 2:
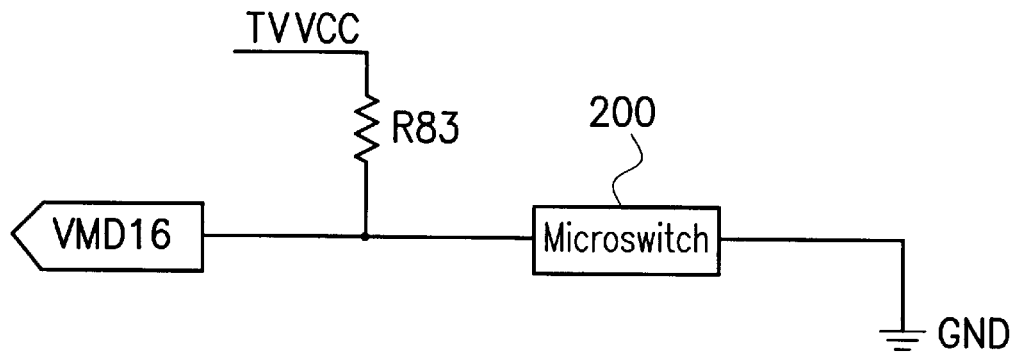
FIG. 2 is a schematic diagram of a first preferred embodiment of the method and apparatus of the invention.

FIG. 2 is a schematic diagram of a first preferred embodiment of the method and apparatus of the invention. In FIG. 2, the microswitch 110 shown in FIG. 1 is here designated by the reference numeral 200. As shown, the microswitch 200 is connected between a setting signal output port (represented by VMD16) and a ground voltage (represented by GND) and further, a resistor R83 is connected between the setting signal output port VMD16 and a system voltage TV VCC, which represents a high-voltage logic state.

When the microswitch 200 is in a connected state, it connects the setting signal output port VMD16 to the ground voltage GND. As a result, the setting signal output port VMD16 takes on the ground voltage GND and thus outputs a LOW-state logic signal.

On the other hand, when the microswitch 200 is in a disconnected state, the setting signal output port VMD16 takes on the system voltage TV VCC via the resistor R83 and thus outputs a HIGH-state logic signal.

In the case that the microswitch 200 is mounted in the S output port (as in the case of FIG. 1), if the output signal from the setting signal output port VMD16 is a LOW-state logic signal, it indicates that the S output port is currently externally disconnected, implying that the AV output port is the one that is currently connected; whereas, if the signal is a HIGH-state logic signal, it indicates that the S output port is the one that is currently externally connected. The output signal from the setting signal output port VMD16 is then transferred to the video display adapter for the video display adapter to set its S/AV option accordingly.

Second Preferred Embodiment

Figure 3:
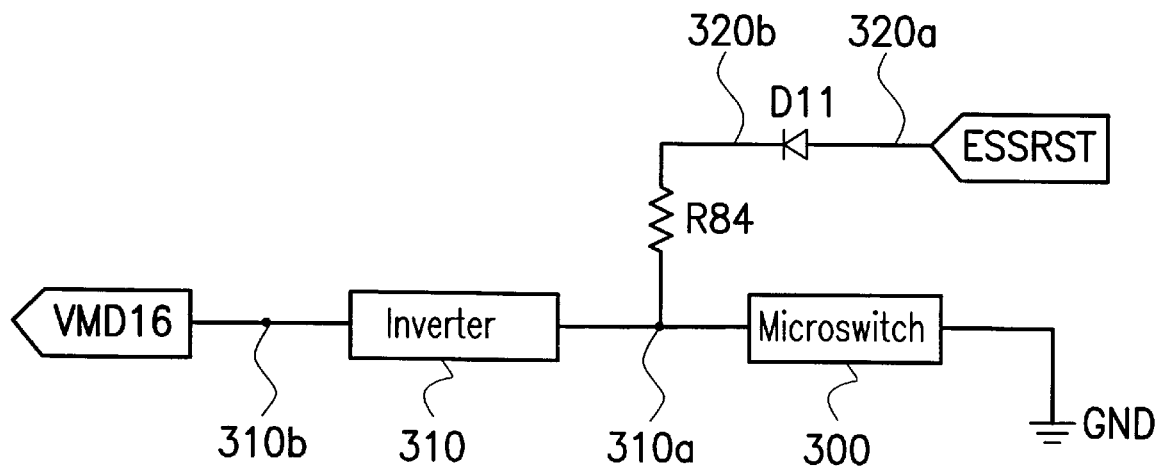
FIG. 3 is a schematic diagram of a second preferred embodiment of the method and apparatus of the invention.

FIG. 3 is a schematic diagram of a second preferred embodiment of the method and apparatus of the invention. In FIG. 3, the microswitch 110 shown in FIG. 1 is here designated by the reference numeral 300. Beside the microswitch 300, the apparatus of the invention further includes a diode D11, a resistor R84, and an inverter 310. The microswitch 300 is connected between the ground GND and a first node 310a. The diode D11 is connected in such a manner that its positive end 320a is connected to a bias voltage ESSRST and its negative end 320b is connected to one end of the resistor R84 which has the other end connected to the first node 310a. The inverter 310 has an input end connected to the first node 310a and an output end connected to a second node 310*b* which is connected to the setting signal output port VMD16. In this preferred embodiment, the bias voltage ESSRST is taken as a high-voltage logic state, while the ground voltage GND is taken as a low-voltage logic state.

When the microswitch 300 is in a connected state, it connects the first node 310*a* to the ground voltage GND, causing the first node 310*a* to take on the ground voltage GND (i.e., a low-voltage logic state). Through the inverter 310, the second node 310*b* is then set to a high-voltage logic state, causing the setting signal output port VMD16 to output a HIGH-state logic signal.

On the other hand, when the microswitch 300 is in a disconnected state, it causes the first node 310*a* to take on the bias voltage ESSRST via the resistor R84 and the diode D11. As a result, the first node 310*a* is set to a high-voltage logic state. Through the inverter 310, the second node 310*b* is then set to a low-voltage logic state, causing the setting signal output port VMD16 to output a LOW-state logic signal.

In the case that the microswitch 300 is mounted in the S output port (as in the case of FIG. 1), if the output signal from the setting signal output port VMD16 is a HIGH-state logic signal, it indicates that the S output port is currently externally disconnected, implying that the AV output port is the one that is currently connected; whereas if the signal is a LOW-state logic signal, it indicates that the S output port is the one that is currently externally connected. The output signal from the setting signal output port VMD16 is then transferred to the video display adapter for the video display adapter to set its S/AV option accordingly.

Third Preferred Embodiment

Figure 4:
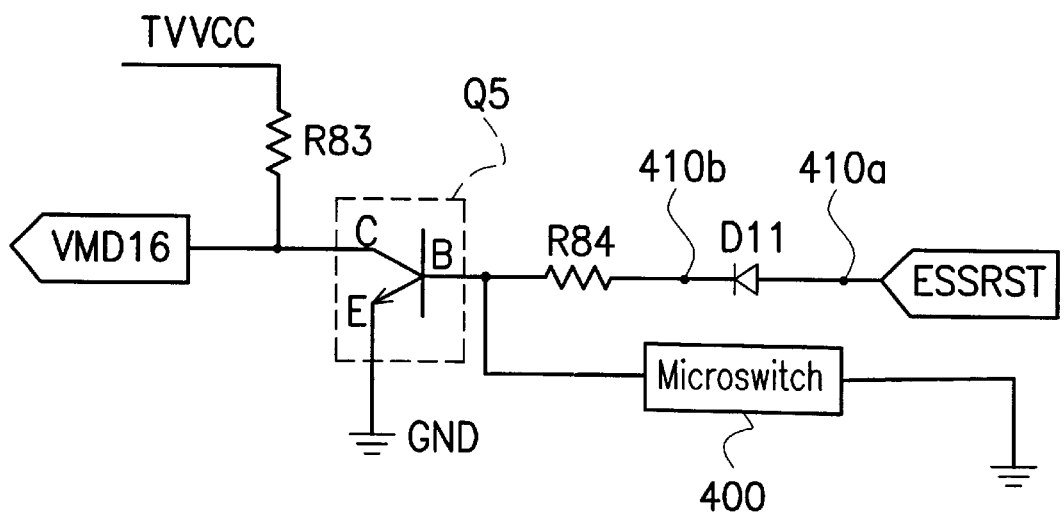
FIG. 4 is a schematic diagram of a third preferred embodiment of the method and apparatus of the invention.

FIG. 4 is a schematic diagram of a third preferred embodiment of the method and apparatus of the invention. In FIG. 4, the microswitch 110 shown in FIG. 1 is here designated by the reference numeral 400. Beside the microswitch 400, the apparatus of the invention further includes a bipolar junction transistor (BJT) Q5, a first resistor R84, a second resistor R83, and a diode D11. The microswitch 400 is connected between the ground GND and the base of the BJT Q5.

The diode D11 is connected in such a manner that its positive end 410*a* is connected to a bias voltage ESSRST and its negative end 410*b* is connected to one end of the resistor R84 which has the other end connected to the base of the BJT Q5. The BJT Q5 is connected in such a manner that its base is connected to one end of the microswitch 400, its emitter is connected to the ground GND, and its collector is connected to the setting signal output port VMD16. The resistor R83 has one end connected to the system voltage TV VCC and the other end connected to the setting signal output port VMD16. In this preferred embodiment, both the bias voltage ESSRST and the system voltage TV VCC are taken as a high-voltage logic state, while the ground voltage GND is taken as a low-voltage logic state.

When the microswitch 400 is in a connected state, the base of the BJT Q5 is connected to the ground voltage GND, thereby turning off the BJT Q5. This allows the setting signal output port VMD16 to take on the system voltage TV VCC via the resistor R83, thereby causing the setting signal output port VMD16 to output a HIGH-state logic signal.

On the other hand, when the microswitch 400 is in a disconnected state, it causes the base of the BJT Q5 to take on the bias voltage ESSRST via the resistor R84 and the diode D11, thereby turning on the BJT Q5. As a result, the collector of the BJT Q5 is connected to the ground voltage GND, causing the setting signal output port VMD16 to take on the ground voltage GND via the BJT Q5 and thereby output a LOW-state logic signal.

In the case that the microswitch 400 is mounted in the S output port (as in the case of FIG. 1), if the output signal from the setting signal output port VMD16 is a LOW-state logic signal, it indicates that the S output port is currently externally disconnected, implying that the AV output port is the one that is currently connected; whereas, if a HIGH-state logic signal, it indicates that the S output port is the one that is currently externally connected. The output signal from the setting signal output port VMD16 is then transferred to the video display adapter for the video display adapter to set its S/AV option accordingly.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on a video display adapter having two video output ports, including a first video output port and a second video output port, to detect which one of the two video output ports is currently externally connected, comprising the steps of:

mounting a microswitch on the first video output port, the microswitch actuated to a first state when the first video output port is externally disconnected and to a second state when the video output port is externally connected;

detecting whether the microswitch is in the first state or in the second state;

if in the first state, generating a first setting signal to the video display adapter to set the video display adapter to select the second video output port as the active one for video output; and if in the second state generating a second setting signal to the video display adapter to set the video display adapter to select the first video output port as the active one for video output.

2. The method of claim 1, wherein the video display adapter is an expansion card.

3. The method of claim 1, wherein the video display adapter is integrated in a computer motherboard.

4. The method for claim 1, wherein the first video output port and the second output port are used to export two different coded video signals, respectively.

5. An apparatus for use on a video display adapter having a video output port to detect whether the video output port is currently externally connected or disconnected, which comprises:

a microswitch mounted on the video output port and having a first end connected to a setting signal output port and a second end connected to a ground voltage representing a low-voltage logic state, the microswitch actuated to a connected state when the video output port is externally disconnected and to a disconnected state when the video output port is externally connected; and a resistor having a first end connected to the setting signal output port and a second end connected to a system voltage representing a high-voltage logic state; wherein when the microswitch is in a connected state, the setting signal output port takes on the ground voltage and thus outputs a LOW-state logic signal serving to indicate that the video output port is currently externally disconnected; whereas when the microswitch is in a disconnected state, the setting signal output port takes on the system voltage via the resistor and thus outputs a HIGH-state logic signal serving to indicate that the video output port is currently externally connected.

6. The apparatus of claim 4, wherein the microswitch includes:

an actuator;

a first conductive piece; and a second conductive piece linked to the actuator; wherein the second conductive piece comes into electrical contact with the first conductive piece when the actuator is subjected to no external urging force when the video output port is currently externally disconnected; and the second conductive piece is electrically set apart from the first conductive piece when the actuator is subjected to external force due to the video output port externally connected.

7. An apparatus for use on a video display adapter having a video output port to detect whether the video output port is currently externally connected or disconnected, which comprises:

a microswitch mounted on the video output port and having a first end connected to a first node and a second end connected to a ground voltage representing a low-voltage logic state, the microswitch actuated to a connected state when the video output port is externally disconnected and to a disconnected state when the video output port is externally connected;

a diode whose positive end is connected to a bias voltage representing a high-voltage logic state;

a resistor having a first end connected to the first node and a second end connected to the negative end of the diode;

an inverter whose input end is connected to the first node and whose output end is connected to a second node; and a setting signal output port connected to the second node; wherein when the microswitch is in a connected state, the setting signal output port takes on the inverted version of the ground voltage and thus outputs a HIGH-state logic signal serving to indicate that the video output port is currently externally disconnected; and whereas when the microswitch is in a disconnected state, the setting signal output port takes on the inverted version of the bias voltage via the resistor and the diode and thus outputs a LOW-state logic signal serving to indicate that the video output port is currently externally connected.

8. The apparatus of claim 7, wherein the microswitch includes:

an actuator, a first conductive piece, and a second conductive piece linked to the actuator; wherein the second conductive piece comes into electrical contact with the first conductive piece when the actuator is subjected to no external urging force when the video output port is currently externally disconnected; and the second conductive piece is electrically set apart from the first conductive piece when the actuator is subjected to external force due to the video output port externally connected.

9. An apparatus for use on a video display adapter having a video output port to detect whether the video output port is currently externally connected or disconnected, which comprises:

a microswitch mounted on the video output port and having a first end connected to a first node and a second end connected to a ground voltage representing a low-voltage logic state, the microswitch actuated to a connected state when the video output port is externally disconnected and to a disconnected state when the video output port is externally connected:

a diode whose positive end is connected to a bias voltage representing a high-voltage logic state;

a first resistor having a first end connected to the first node and a second end connected to the negative end of the diode;

a BJT whose base is connected to the first node, whose emitter is connected to the ground, and whose collector is connected to a second node;

a second resistor having a first end connected to a system voltage representing a high-voltage logic state and a second end connected to the second node; and a setting signal output port connected to the second node; wherein when the microswitch is in a connected state, the BJT is switched off, causing the setting signal output port to take on the system voltage via the second resistor and thus output a HIGH-state logic signal serving to indicate that the video output port is currently externally disconnected; and whereas when the microswitch is in a disconnected state, the BJT is switched on by the bias voltage, causing the setting signal output port to take on the ground voltage via the BJT and thus output a LOW-state logic signal serving to indicate that the video output port is currently externally connected.

10. The apparatus of claim 9, wherein the microswitch includes:

an actuator;

a first conductive piece, and a second conductive piece linked to the actuator; wherein the second conductive piece comes into electrical contact with the first conductive piece when the actuator is subjected to no external urging force when the video output port is currently externally disconnected; and the second conductive piece is electrically set apart from the first conductive piece when the actuator is subjected to external force due to the video output port externally connected.

* * * * *